(12) United States Patent
Cook et al.

(10) Patent No.: US 6,829,716 B2
(45) Date of Patent: Dec. 7, 2004

(54) LATCH STRUCTURE FOR INTERLOCKED PIPELINED CMOS (IPCMOS) CIRCUITS

(75) Inventors: Peter W. Cook, Mount Kisco, NY (US); Stanley E. Schuster, Granite Springs, NY (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 09/836,375

(22) Filed: Apr. 17, 2001

(65) Prior Publication Data

US 2001/0056552 A1 Dec. 27, 2001

Related U.S. Application Data

(60) Provisional application No. 60/212,000, filed on Jun. 16, 2000.

(51) Int. Cl.[7] ............................. G06F 1/04; G06F 13/00
(52) U.S. Cl. ...................... 713/500; 713/600; 711/109
(58) Field of Search ................................ 713/500, 600, 713/320; 711/169, 109; 710/52

(56) References Cited

U.S. PATENT DOCUMENTS

| | | | |
|---|---|---|---|
| 4,837,740 A | | 6/1989 | Sutherland |
| 5,187,800 A | | 2/1993 | Sutherland |
| 5,502,414 A | * | 3/1996 | Tran et al. .................. 327/434 |
| 5,664,212 A | * | 9/1997 | Fant et al. .................. 345/441 |
| 5,918,042 A | * | 6/1999 | Furber ........................ 713/600 |
| 5,920,899 A | * | 7/1999 | Chu ............................ 711/169 |
| 6,182,233 B1 | | 1/2001 | Schuster et al. |
| 6,667,645 B1 | * | 12/2003 | Fletcher et al. ............. 327/200 |

FOREIGN PATENT DOCUMENTS

| | | | | |
|---|---|---|---|---|
| EP | 409448 A2 | * | 1/1991 | ............. H03F/1/30 |
| EP | 607670 A1 | * | 7/1994 | ........... G06F/13/40 |

OTHER PUBLICATIONS

Schuster et al, Asynchronous Interlocked Pipelined CMOS Circuits Operating at 3.3–4.5GHz, Feb. 9, 2000, IEEE, pp. 292–293.*
Taylor et al, Reduced Comlexity Two–Phase Mcropipeline Latch Controller, Oct. 1998, vol. 33, No. 10, pp. 1590–1593.*
Gloria et al, Efficient Semicustom Micropipeline Design, Sep. 1995, vol. 3, No. 3, pp. 464–469.*
Shih–Lien Lu, Implementation of Micropipelines in Enable/Disable CMOS Differential Logic, Jun. 1995, vol. 3, No. 2, pp. 338–341.*
Schuster et al., Provisional Application No. 60/212,000 filed Jun. 16, 2000; "Simple Latch Structure for Interlocked Pipelined CMOS (IPCMOS) Circuits".
Schuster et al., "Asynchronous Interlocked Pipelined CMOS Circuits Operating at 3.3–4.5GHz," OSSCC 2000/Session 17/ Logic and Systems/Paper WA 17.3.
Cook et al., U.S. patent application Ser. No. 09/746,647 filed Dec. 21, 2000; "Asynchronous Pipelined Control Interface".

* cited by examiner

Primary Examiner—Dennis M. Butler
Assistant Examiner—Suresh Suryawanshi
(74) Attorney, Agent, or Firm—Louis J. Percello; F. Chau & Associates, LLC

(57) ABSTRACT

Circuits and methods for operating a latch structure are disclosed. The circuits include a plurality of stages, and each stage includes a first logic circuit, a latch coupled to a second logic circuit of an adjacent stage and a switch which connects the first logic circuit to the latch in a first state and disconnects the logic circuit from the latch in a second state. A local clock circuit controls the first and second states by providing a locally generated clock signal to activate the switch. The locally generated clock signals are generated by interlocking handshake signals from a local clock circuit of an adjacent stage.

15 Claims, 12 Drawing Sheets

Power Versus Switching Factor

LATCH STRUCTURE FOR INTERLOCKED PIPELINED CMOS (IPCMOS) CIRCUITS

CROSS REFERENCE TO RELATED APPLICATION

This application claims priority to Provisional Application Ser. No. 60/212,000 filed Jun. 16, 2000. Provisional Application Ser. No. 60/212,000 is incorporated herein by reference.

BACKGROUND OF THE INVENTION

1. Field of the Invention

The present invention relates to data transfer, and more particularly to a system and method for transferring data through latches which reduces the number of latches, reduces power consumption and enables the latches to receive or transmit data only when an operation is to be performed.

2. Description of the Related Art

Interlocked pipelined complementary metal oxide semiconductor (IPCMOS) circuits and techniques are disclosed in U.S. Pat. No. 6,182,233, incorporated herein by reference. A paper describing the results of an implementation of these IPCMOS circuits on a test site is found in an article published in the ISSCC 2000 Digest of Technical Papers, Session 17, Logic and Systems, Paper WA 17.3, by Schuster et al. entitled "Asynchronous Interlocked Pipelined CMOS Circuits at 3.3–4.5 GHz", incorporated herein by reference and hereinafter referred to as the ISSCC paper. In the ISSCC paper, asynchronous interlocked locally generated clocks drive a path through a 3 to 2 compressor tree of a Floating Point Multiplier (FPM) at frequencies as fast as 4.5 GHz in a 0.18 micron 1.5 Volt bulk CMOS technology. Power reductions greater than two times are estimated with these IPCMOS techniques.

In U.S. Pat. No. 6,182,233 referenced above, circuits and techniques are disclosed for asynchronously interlocking blocks in the forward and reverse directions that have extremely small overhead for handshaking. This makes very high performance possible.

Interlocked Pipelined CMOS circuits and techniques are also disclosed in commonly assigned U.S. application Ser. No. 09/746,647 to Cook et al., filed on Dec. 21, 2000 and entitled "Asynchronous Pipeline Control Interface," (hereinafter referred to as Cook et al.). Cook et al. is incorporated herein by reference. Cook et al. includes circuits and techniques for asynchronously interlocking blocks in the forward and reverse directions that have extremely small overhead for the handshaking. This makes very high performance possible.

In conventional synchronous approaches a global clock activates all the latches simultaneously. Synchronous pipelines are typically subject to clock skew problems which may cause undesirable delays in the pipelines.

Referring to FIG. 1A, a master/slave latch 10 is employed to prevent data from logic stage 11 from propagating through latch 10 before a logic stage 12 is ready to act on the data. Master/slave latch 10 includes a master latch 18 and a slave latch 20. Master latch 18 empties data into slave latch 20 in accordance with global clock signals. Switches 14 and 16 of latch 10 are enabled by global clock pulses C1 and C2, respectively, to transfer data (Data) across latch 10 as shown in FIG. 1B which shows a timing diagram. Unfortunately, the master slave approach has to deal with clock skew and jitter and consumes more power in the clocking to drive both the master and the slave latches.

Referring to FIG. 2A, another approach is to split a logic stage into portions 22 (preferably split in half in accordance with delay (i.e., one half the delay for each portion 22)) and place a latch 24 and a latch 26 such that latches 24 and 26 are split between the logic stages 22. Switches 14 and 16 of latches 24 and 26 are enabled by global clock pulses C1 and C2, respectively, to transfer data (Data (a and Data (b)) across the latches as shown in FIG. 2B which shows a timing diagram. This reduces the problem of dealing with clock skew and jitter, but since the number of latches is the same as in the master slave approach of FIG. 1A, the clock power is not reduced. In fact, there will be additional power consumed by this approach since inputs which are connected to the logic 22 receive data before the logic stages 22 attain their final values. This will result in a higher logic switching factor. In addition, both the approaches of FIGS. 1A and 2A consume power whether or not there is an operation to perform as a result of the continuously running synchronous (global) clock.

Therefore, a need exists for latch circuits and methods of operating the latch circuits which reduce the number of latches and/or clock loading, consume power only when there is an operation to perform and achieve higher speed compared to existing approaches.

SUMMARY OF THE INVENTION

Circuits and methods for operating a latch structure are disclosed. The circuits include a plurality of stages, and each stage includes a first logic circuit, a latch coupled to a second logic circuit of an adjacent stage and a switch which connects the first logic circuit to the latch in a first state and disconnects the logic circuit from the latch in a second state. A local clock circuit controls the first and second states by providing a locally generated clock signal to activate the switch. The locally generated clock signals are generated by interlocking handshake signals from a local clock circuit of an adjacent stage.

A method for transferring data in an interlocked pipeline circuit having a plurality of stages includes providing, for each stage, a latch connected to an input of that stage and a switch for selectively coupling the input of the stage to an output of the previous stage. When the data is valid in a current stage, a valid signal is sent to a local clock circuit of a next stage of the plurality of stages. An acknowledge signal is sent from the local clock circuit of the next stage to a local clock circuit of the current stage responsive to the valid signal. A local clock signal is generated at the local clock circuit of the current stage of the plurality of stages based on the acknowledge signal and the valid signal. The switch of the current stage is enabled based on the local clock signal to permit data transfer to the latch of the current stage from the output of the previous stage.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides a latch structure which employs a locally generated clock. The latch structure includes latches which are enabled by the locally generated clock to permit data transfer from one latch stage while adjacent latch stages are prevented from transferring data. The latch structure is nearly immune from clock skew and jitter and significantly reduces power consumption.

Figure 1A:
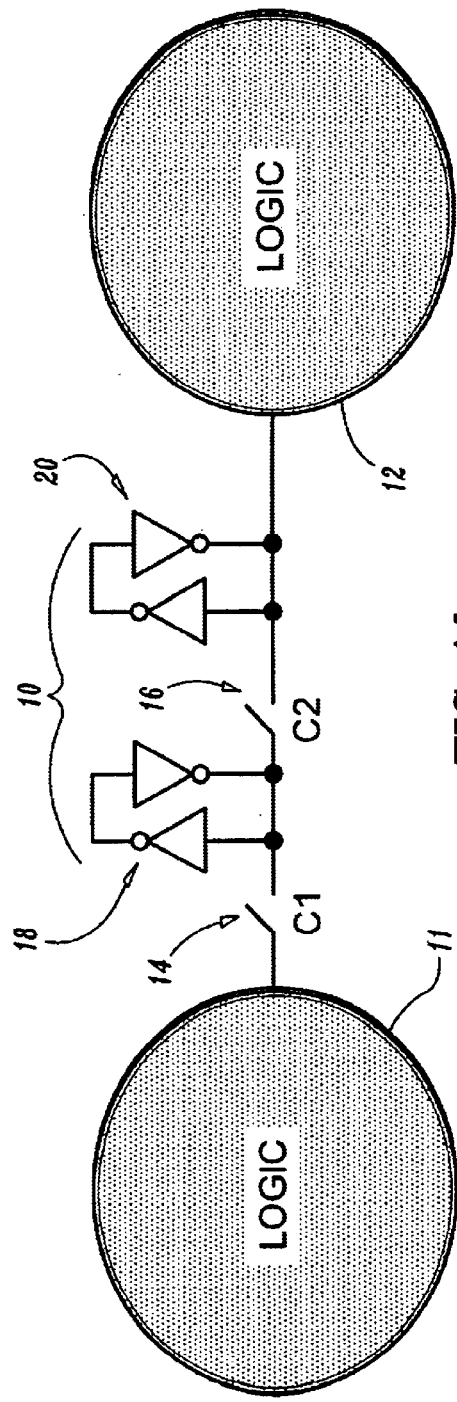
FIG. 1A is a schematic diagram of a conventional master/slave latch.
Figure 1B:
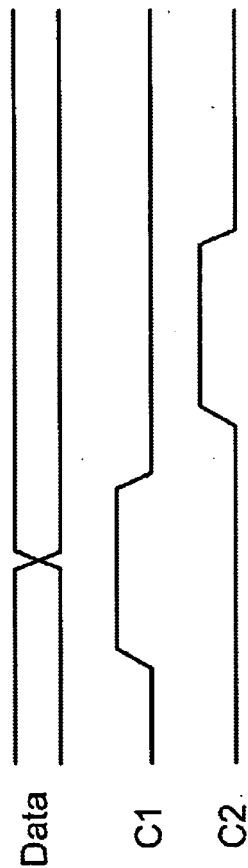
FIG. 1B is a timing diagram for demonstrating operation of the conventional master/slave latch of FIG. 1A.

In Cook et al., cited above, a method for embedding a latch in a dynamic logic stage was disclosed. This combination of logic and latch works well for dynamic circuits. For static circuits, the combination of a look aside or parallel latch as shown in FIGS. 1A and 2A can be combined with a locally generated interlocked clock in accordance with the present invention.

It should be understood that the elements shown in the FIGS. may be implemented in various forms of hardware, software or combinations thereof. Preferably, these elements are implemented in hardware on one or more appropriately programmed general purpose integrated circuits which may include a processor, memory and input/output interfaces.

Figure 2A:
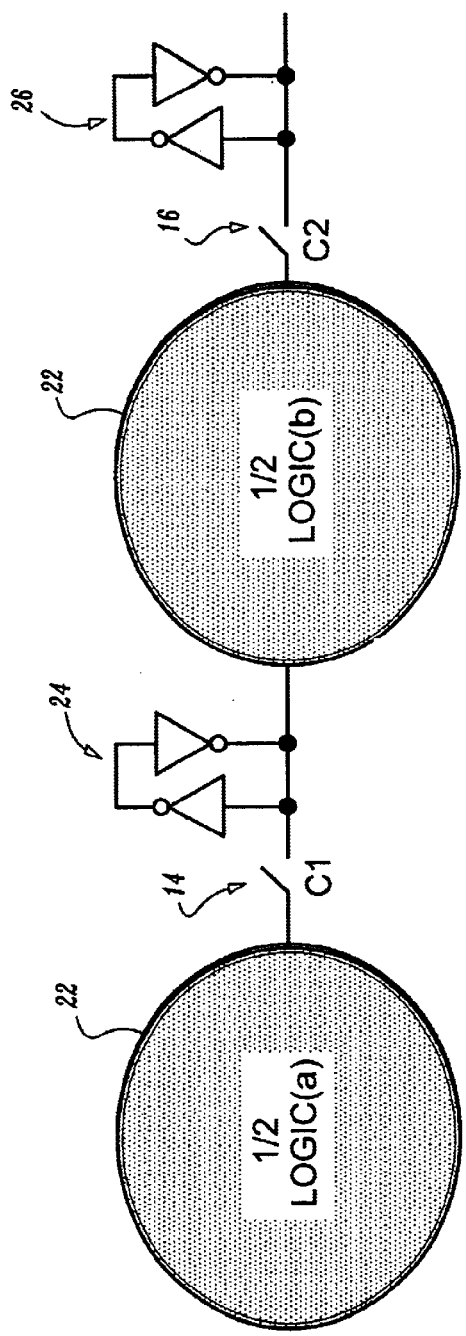
FIG. 2A is a schematic diagram of a conventional transparent latch circuit interposed between logic circuits split in accordance with delay.
Figure 2B:
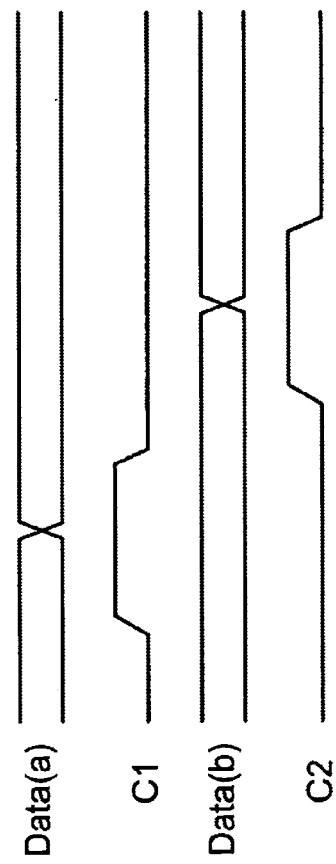
FIG. 2B is a timing diagram for demonstrating operation of the conventional transparent latch of FIG. 2A.
Figure 3A:
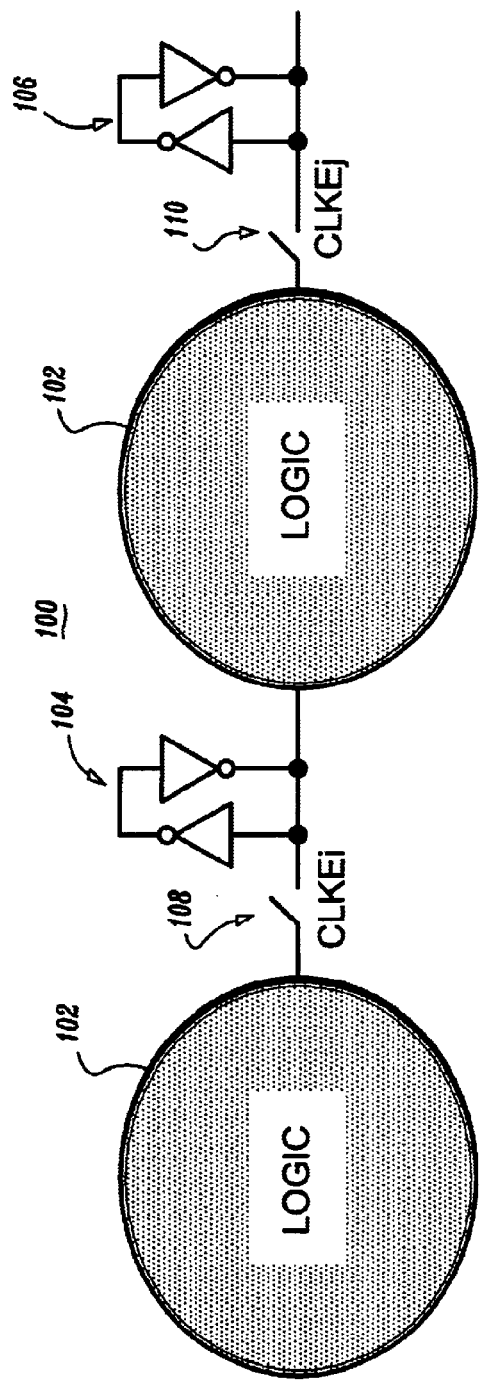
FIG. 3A is a schematic diagram of a interlocked pipeline latch in accordance with the present invention.
Figure 3B:
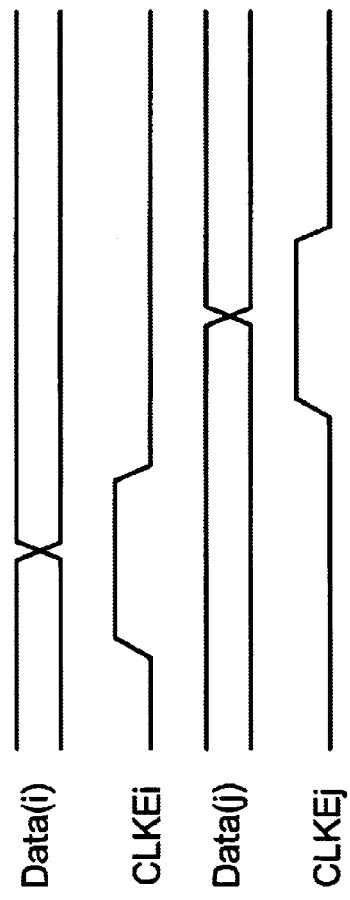
FIG. 3B is a timing diagram for demonstrating operation of the latch of FIG. 3A in accordance with the present invention.

Referring now to the drawings in which like numerals represent the same or similar elements and initially to FIG. 3A, a simplified pipeline structure 100 is shown in accordance with one embodiment of the present invention. Latch structure 100 includes full logic stages 102 (as opposed to the half logic stages of FIG. 2A). A latch 104 and a latch 106 are separated by one full logic stage 102. Switches 108 and 110 of latches 104 and 106 are enabled by locally generated clock signals CLKEi and CLKEj, respectively, to transfer data (Data (i) and Data (j)) across the latches as shown in FIG. 3B which shows a timing diagram.

Although latches 104 and 106 and logic stages 102 of FIG. 3A look similar to the latches and logic of FIG. 2A, the number of latches differ by a factor of two times since full logic stages 102 can advantageously be employed. This is because the interlocking of stages (described below) produces local clocks (CLKE) which are only enabled when the data for that stage is valid and corresponding local clocks on immediately adjacent stages are not enabled. In other words, the interlocking handshake signals provide operations such that when one stage is enabled immediately adjacent stages are disabled for data transfer in a current clock cycle. This eliminates the possibility of signals propagating through multiple latches in a single clock cycle. Therefore, in this example, half the number of latch stages are needed while still maintaining safe operation. The reduced number of latch stages combined with enabling the local clocks only when there is an operation to perform results in significant power reduction.

Figure 4:
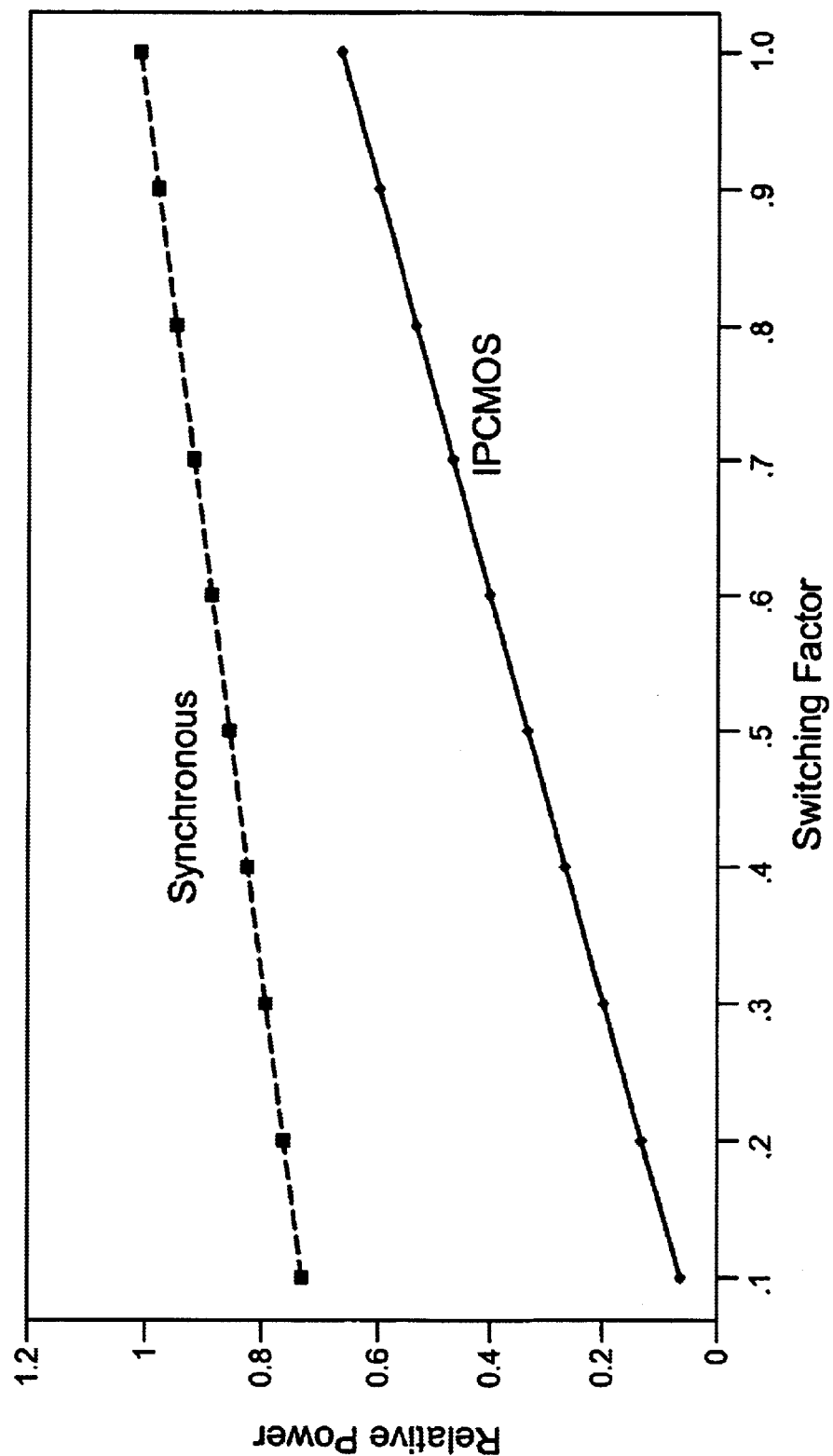
FIG. 4 is a plot of relative power versus switching factor which compares the prior art with the present invention.

Referring to FIG. 4, a plot of power versus switching factor comparing a prior art "Synchronous" latch structure (e.g., FIG. 1A or FIG. 2A) to an interlocked pipelined CMOS (IPCMOS) latch structure in accordance with the present invention. The plot includes the power for the master/slave approach (FIG. 1A) or transparent latch approach (FIG. 2A) versus the IPCMOS approach of the present invention as a function of macro switching factor, under the assumption that 70% of the power is in the clocks and latches. Power from input transitions after the clock is activated are not considered in any of the cases. Switching factors for most macros normally range from 10% to 30%. Surprisingly, by implementing the locally generated clock and latch structure of the present invention, power reductions of 5 times to more than 10 times can be realized.

Figure 5:
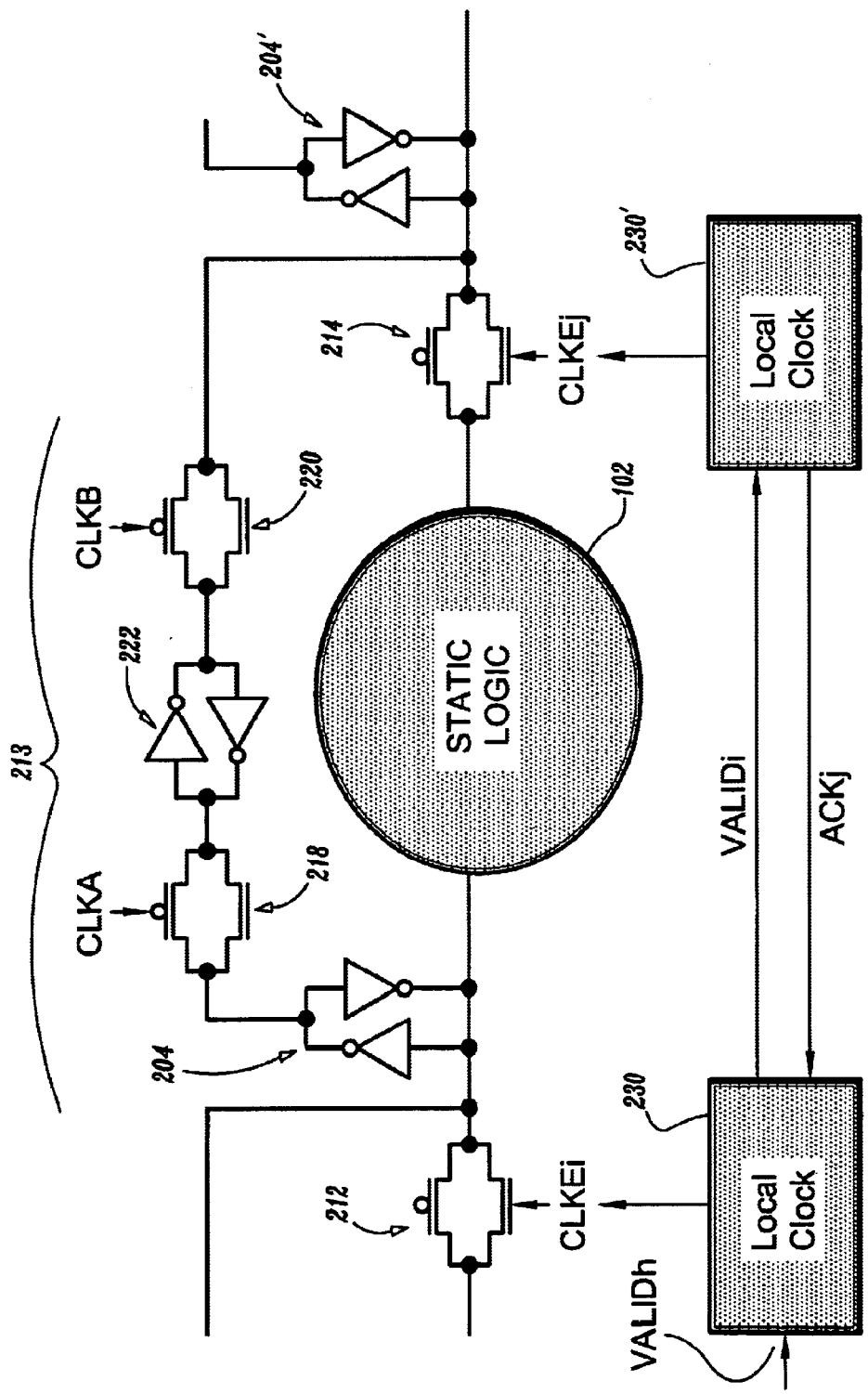
FIG. 5 is a schematic diagram of a stage in a pipeline employing the latch structure of the present invention and further employing a scan chain in accordance with an embodiment of the present invention.

Referring to FIG. 5, a schematic of a latch structure including scan chains is shown in accordance with one embodiment of the present invention. FIG. 5 illustrates latch operation in accordance with the present invention. During normal operation, data is captured by a latch 204 when a local clock CLKE (CLKEi in this case) for that stage is enabled. CLKE is generated when an acknowledge signal (ACKj) is received from a local clock circuit 230' of a succeeding adjacent pipeline stage, and VALIDh is received from a preceding pipeline stage h (not shown). CLKEi turns on pass gate switch 212 at the input to a pipeline stage 213.

During testing, the enable clocks CLKE are turned off and clock signals CLKA and CLKB are used to scan data into or out of latches 204 (and 204') in the pipeline stages. When CLKA is enabled, turning on switch 218, data is transferred to latch 222. Next, CLKA is turned off and CLKB is enabled, turning on switch 220. This results in the data from latch 222 being transferred to latch 204'. Although only one pipeline stage is shown, one skilled in the art would understand that multiple stages could be interconnected and that data could either be scanned into the latch associated with each stage from an external pin or data from the latches associated with each stage could be scanned out to an external pin.

In a normal mode of operation, CLKA and CLKB and their switches 218 and 220 are off (not conducting) and data moves from one latch stage 204 to the next (latch 204') as the local CLKE clocks are enabled. CLKA and CLKB are externally activated clocks which may be activated during testing. A local clock circuit 230 sends a VALID signal (VALIDi) to indicate that valid data was received from a pipeline stage upstream from stage 213. Local clock circuit 230' sends an acknowledge signal (ACKj) indicating that the VALID signal was received. Clock pulse CLKEi is generated locally for stage 213. CLKEi enables data to be transferred to latch 204 and through static logic 102. Data output from static logic 102 awaits the next clock cycle to be locally generated by local clock 230' to enable the data to be transferred to a downstream latch stage 204'. In this way, one stage is enabled at a time ensuring that data does not move to more than one stage in a single clock cycle. As described above, this reduces the number of latches needed to safely transfer data by at least half the number of latches needed for prior art approaches.

The interlocking connections which employ VALID and ACK signals are one important feature of the present invention. The interlocking signals guarantee that switches of adjacent stages to the stage performing the operation are not turned on at the same time as the switches of the current stage. This prevents data from propagating through more than one latch when the local clock to a stage is activated. During the time the switch is closed, data simply passes from the input side of the switch to the output side launching data to the next logic stage. The parallel or look aside latch holds the information until the switch is closed again and new data is brought in.

Figure 6:
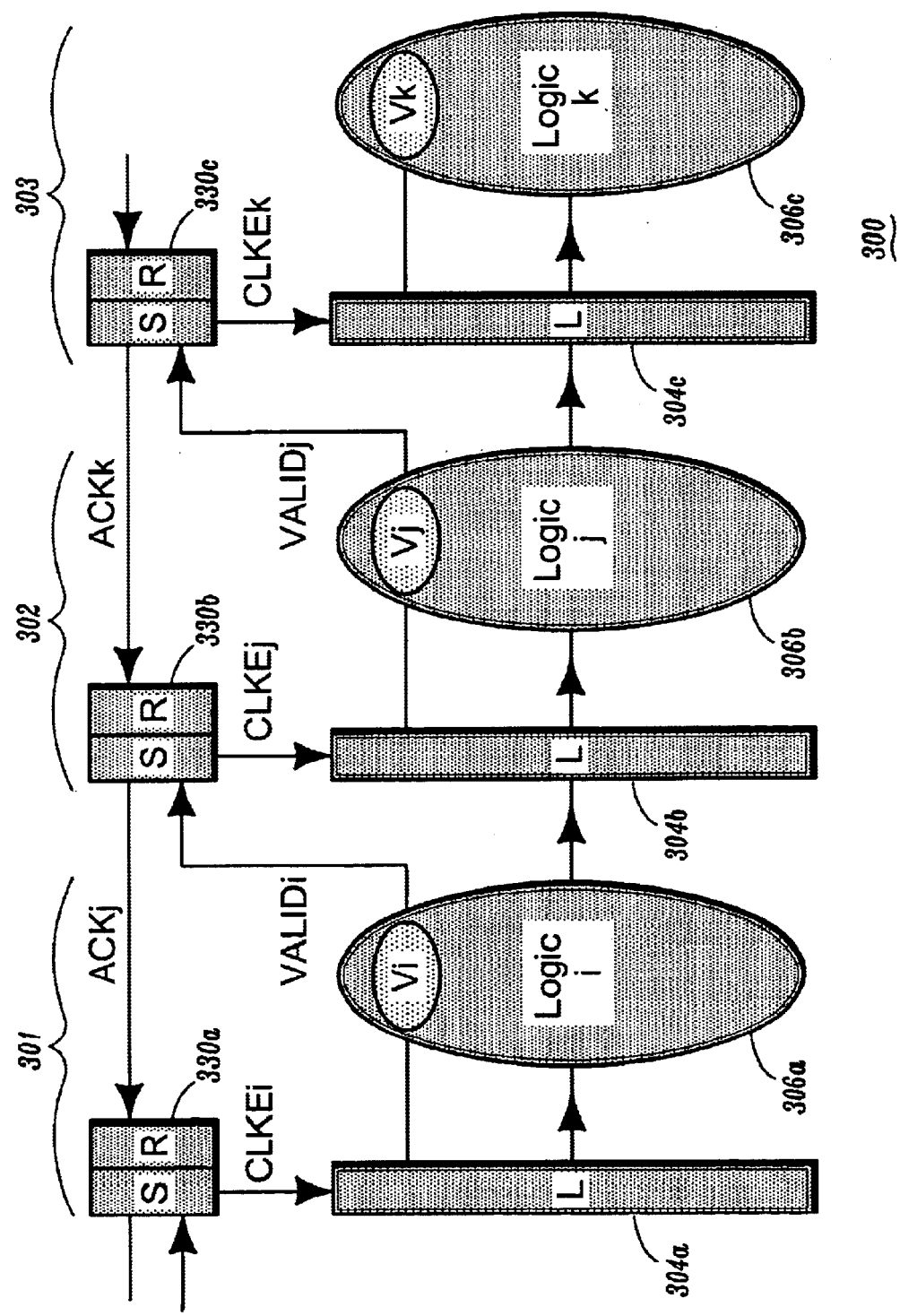
FIG. 6 is a schematic diagram of multiple stages in a pipeline showing interlocking connections between the stages in accordance with the present invention.

Referring to FIG. 6, a multiple stage pipeline 300 is shown in accordance with one embodiment of the present invention. Pipeline 300 is an asynchronous pipeline. Stages 301, 302 and 303 each include a latch stage 304 for temporary storage of data which passes from stage to stage through pipeline 300. Latch stages 304a, 304b and 304c are interposed between logic circuits 306a, 306b, 306c for each stage. Latch stages 304a, 304b and 304c are each enabled by a separate locally generated clock signal (CLKEi, CLKEj and CLKIEk, respectively).

When CLKEi is enabled, latch 304a simultaneously captures that data that is at its input and launches this data into logic 306a. In addition, CLKEi launches the valid signal VALIDi which goes to interlock block 330b. Interlock block 330b is activated causing CLKEj to be enabled when both VALIDi and ACKk have occurred. When CLKEj is enabled, latch 304b simultaneously captures the data at its input from the output of logic 306a in stage 301 and launches that data into logic 306b of stage 302. In addition, CLKEj launches the valid signal VALIDj which goes to interlock block 330b in stage 303. The process is continued for each stage in the pipeline 300. Local clock circuits 330a, 330b and 330c are employed for generating and receiving handshaking interlock signals, VALID and ACK.

Figure 7:
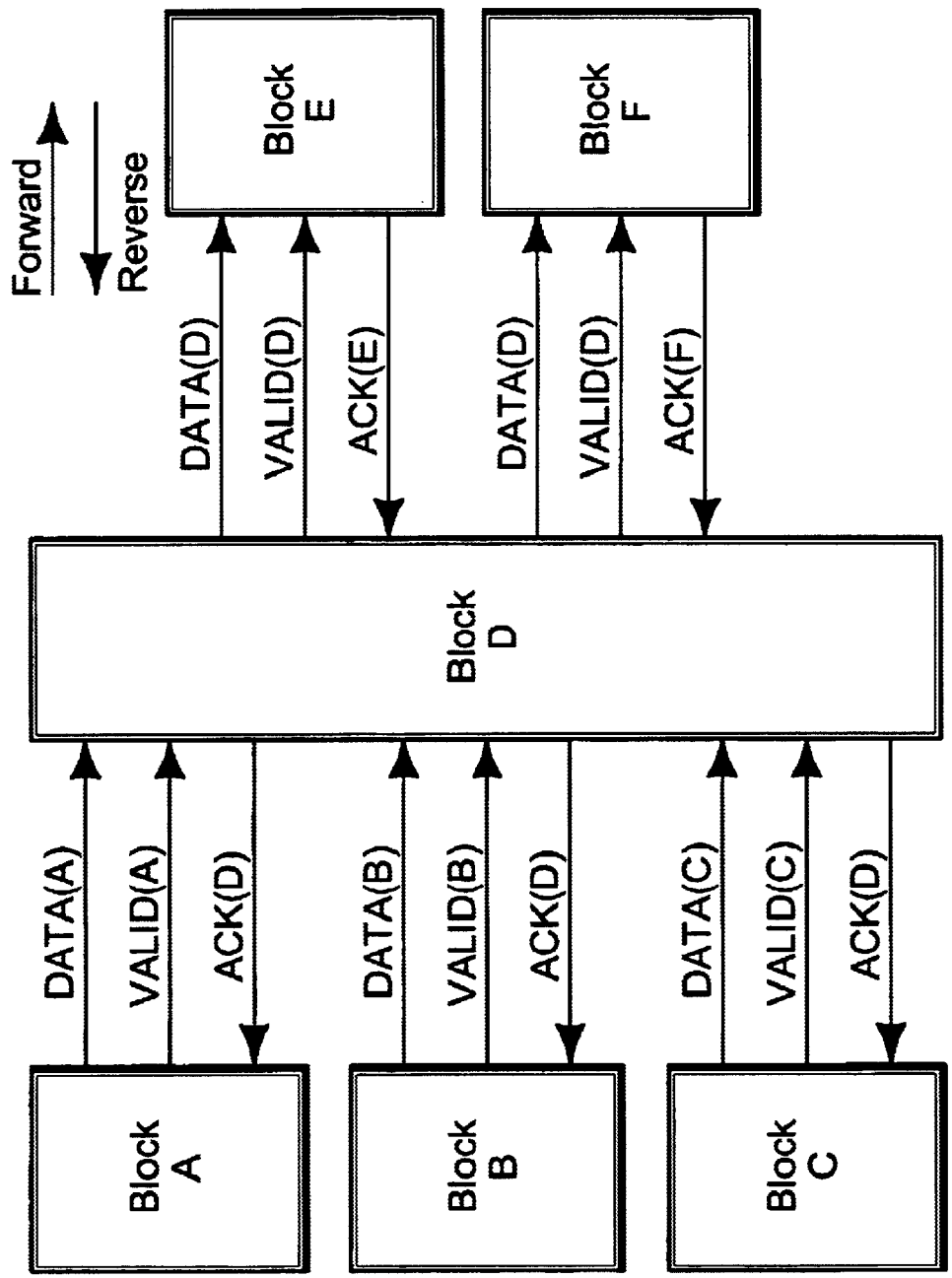
FIG. 7 is a schematic block diagram showing interlocking connections in forward and reverse directions between stages of a pipeline in accordance with the present invention.

Referring to FIG. 7, a block diagram showing interlocking at the block level in the forward and reverse directions is illustratively shown. Block D is interlocked with all of blocks A, B, C, E and F with which block D interacts. In the forward direction, dedicated VALID signals emulate the worst case path through each driving block and thus determine when data can be latched within block D. In the reverse direction, Acknowledge (ACK) signals indicate that data has been received by the subsequent blocks and that new data may be processed within block D. In this interlocked approach local clocks are generated only when there is an operation to perform.

Figure 8:
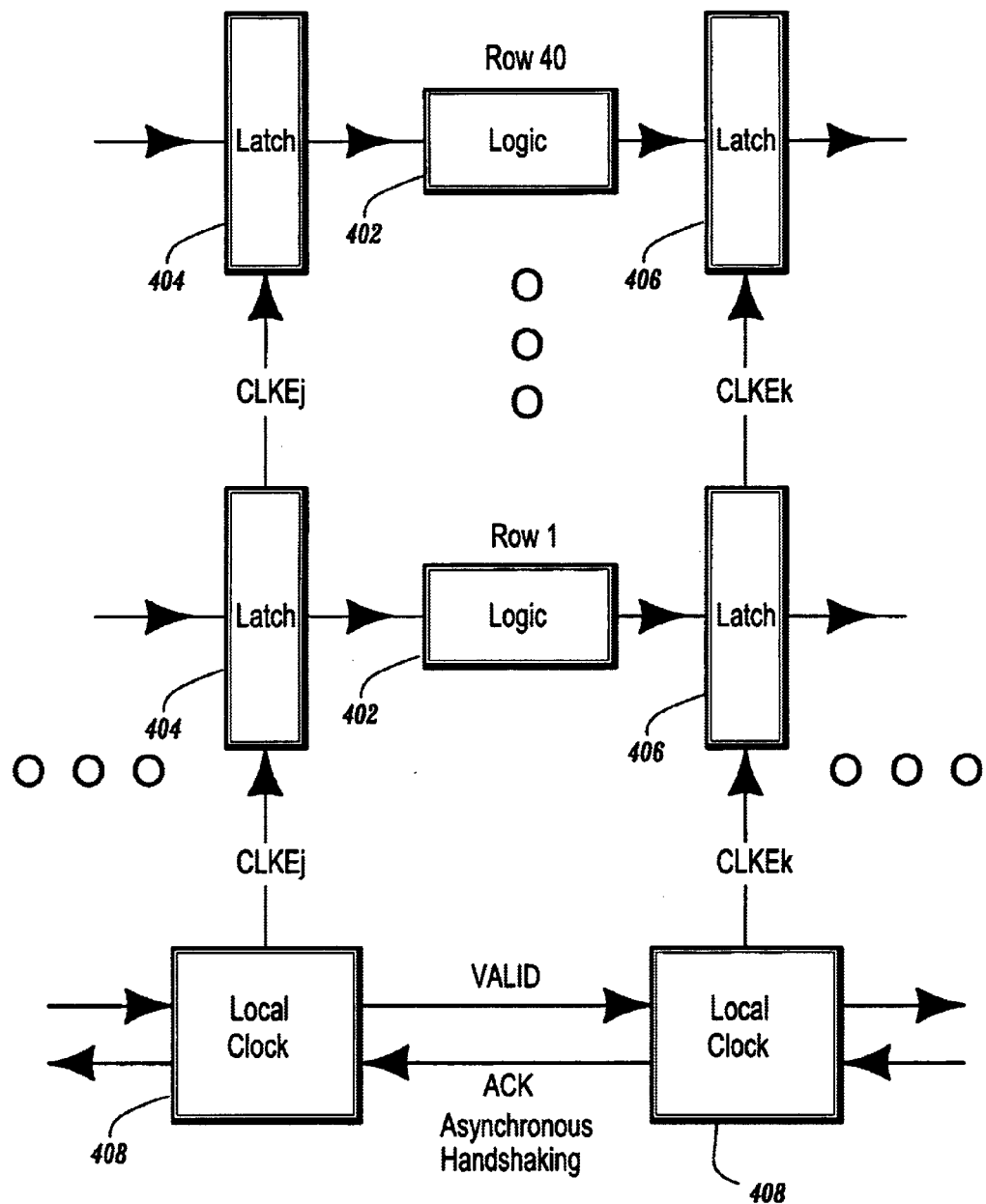
FIG. 8 is a schematic diagram of two latch stages in a pipeline of a multiplier employing the latch structure and local clock circuits in accordance with the present invention.

Measured results on an experimental chip demonstrate robust operation for IPCMOS at 3.3 GHz under typical conditions and 4.5 GHz under best case conditions in a 0.18 micron 1.5V CMOS technology. The block diagram of FIG. 8 illustratively shows the circuit implemented. Logic 402 between latches 404 and 406 includes two stages of a worst case path through the 3 to 2 compressor tree of a 64b floating point multiplier with a total of ten of these stages included in the path. In this example, the asynchronous handshaking local clock circuits 408 were each loaded with 40 latches to simulate practical loading. Since the locally generated clocks for each stage (e.g., CLKEj and CLKEk) are active only when the data to a given stage is valid, power is conserved when the logic blocks are inactive. Furthermore, with the simplified clock environment, it is possible to design a very simple single stage latch that can capture and launch data simultaneously without the danger of a race.

Figure 9A:
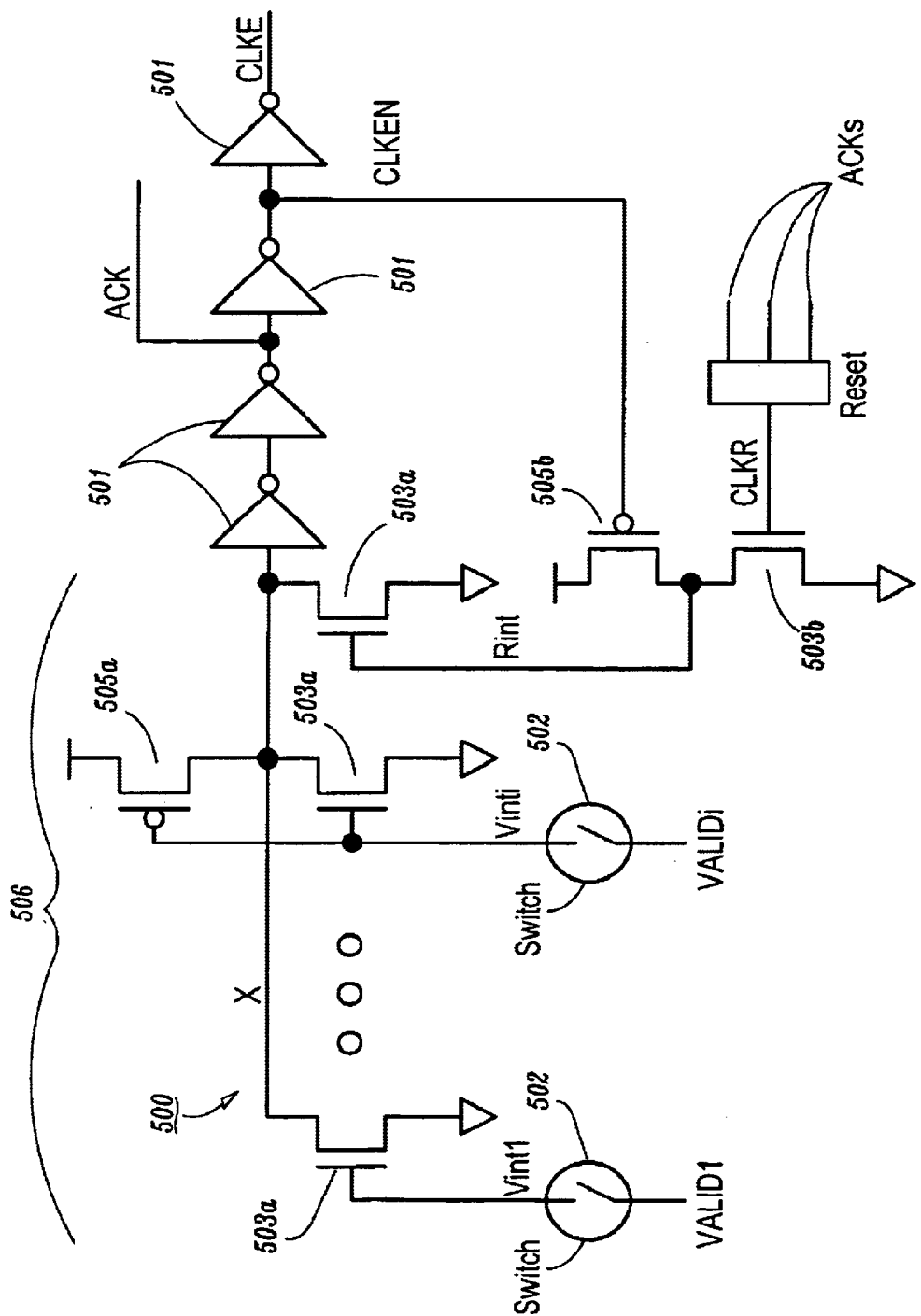
FIG. 9A is a schematic diagram of a local clock circuit in accordance with one embodiment of the present invention.
Figure 9B:
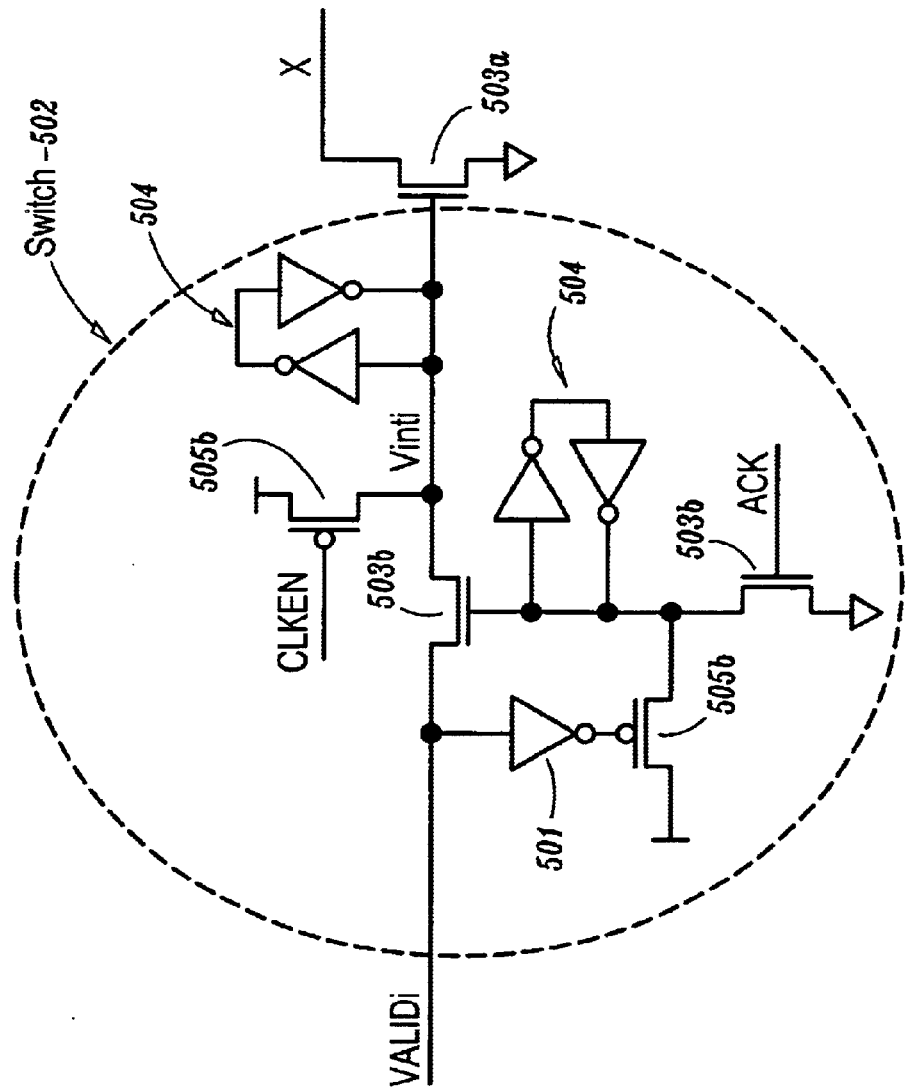
FIG. 9B is a schematic diagram of a switch employed in the local clock circuit of FIG. 9A in accordance with one embodiment of the present invention.

IPCMOS achieves high speed interlocking, in one embodiment by combining the function of a static NOR and an input switch to perform a unique cycle dependent AND function as exemplified by a local clock circuit or a strobe circuit 500 shown in FIGS. 9A and 9B. Every local clock circuit 408 in FIG. 8 includes a strobe circuit 500 which implements asynchronous interlocking between stages.

Referring to FIGS. 9A and 9B, a strobe or local clock circuit 500 is shown in accordance with an illustrative embodiment of the present invention. Invertors 501, n-channel devices 503a and 503b, latches 504, and p-channel devices 505a and 505b may be connected, replaced or otherwise altered as known by one skilled in the art. The operation of strobe circuit 500 can be understood by starting at the end of a cycle when external valid signals (VALID1 to VALIDi) and CLKR which is generated from the acknowledge signals (ACK) are low, switches 502 are open, and the internal valid signals (Vint1 to Vinti) and Rint are high. The strobe outputs, CLKE and ACK, which are high and low respectively, will transition to low and high respectively only when all of the internal valid signals (Vint1 to Vinti) and Rint go low. For this to happen, each external valid signal (VALID1 to VALIDi) is first reset high, thereby turning on its associated switch 502. Next, each of the valid inputs (VALID1 to VALIDi) will transition low, as data for that input becomes valid. This causes the associated internal valid signal (Vint1 to Vinti) to also go low. CLKEN is the falling clock signal having opposite polarity of CLKE.

The strobe circuit 500 outputs, ACK and CLKE will both transition high and CLKEN will transition low, when the last of the external valid signals (VALID1 to VALIDi) makes its downward transition and CLKR has gone high. When this occurs all the internal valid signals (Vint1 to Vinti) and Rint will be low. ACK transitioning high turns each switch (502) off, since all the external valid signals (VALID1 to VALIDi) are low at this time.

ACK is also the handshaking signal to stages or blocks transmitting data. The ACK signal represents that data has been received and the blocks can send more data. Immediately after ACK turns switch 502 off, CLKEN will precharge each of the internal valid nodes (Vint) and Rint high. This in turn will cause ACK and CLKE to go low and CLKEN to go high. In the strobe circuit 500 of FIG. 9A, a p-channel load device 505a of a static NOR 506, also comprising n-channel devices 503a, is connected to only one internal Valid signal (Vinti). The Valid signal to which the load is connected should be the nominally last arriving. However, in actual operation if another signal arrives last the circuit will function normally but with some additional power dissipation. A node X is labeled in FIGS. 9A and 9B to provide a reference between the FIGS.

Figure 10:
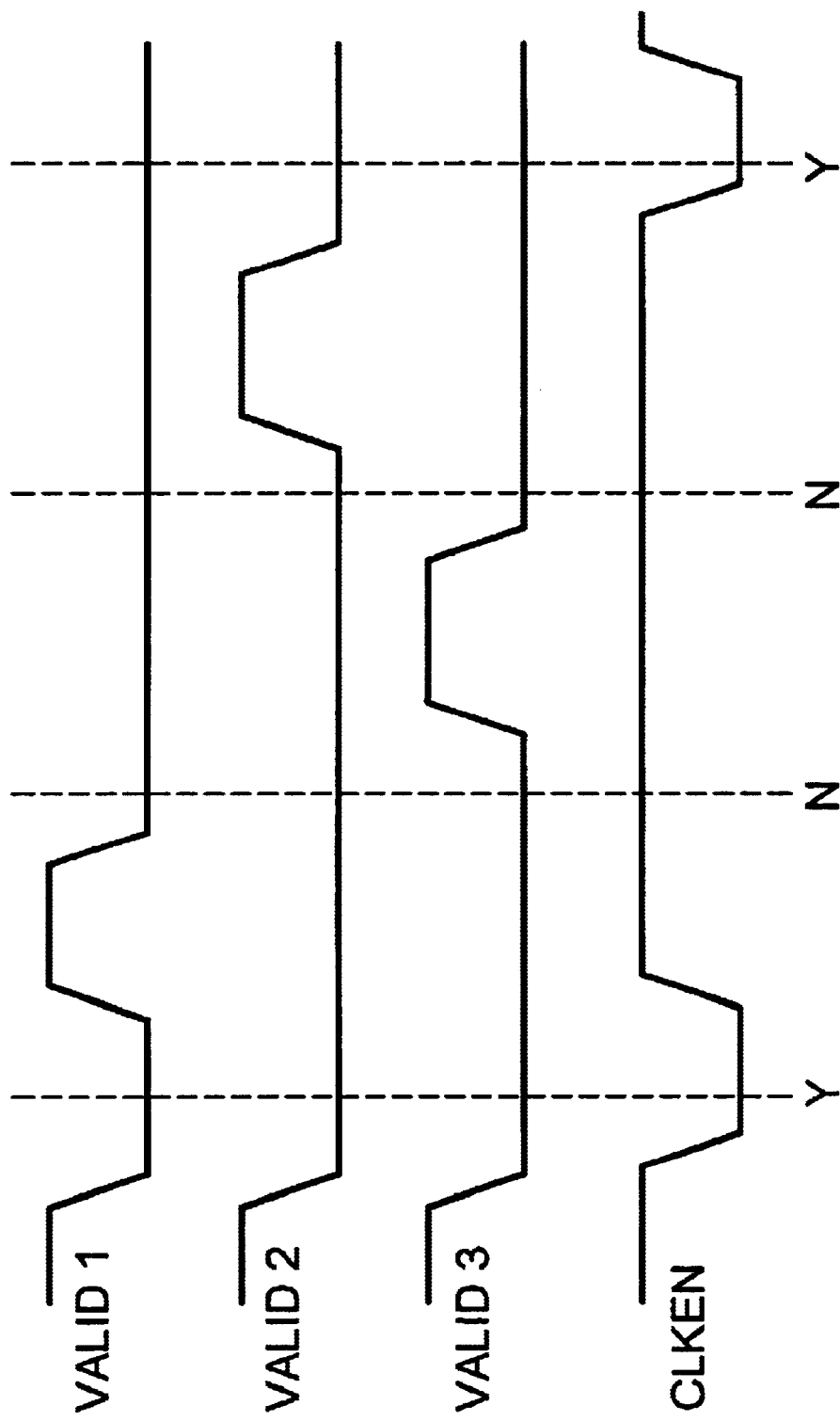
FIG. 10 is an illustrative timing diagram showing how the local clock circuit of FIG. 9A performs an AND function on a plurality of valid signals in accordance with the present invention.

Referring to FIG. 10, the way strobe circuit 500 ANDs the valid inputs and at the same time keeps track of the cycle in which the inputs occur is seen in the wave forms of FIG. 10 for a circuit with three valid signals. Initially, all the external valid signals (VALID 1, VALID 2 and VALID 3) are high. They all transition low and the strobe circuit generates a low CLKEN pulse output. Subsequently, a strobe output is generated only after all 3 valid inputs have transitioned low to high to low. Thus the strobe circuit keeps track of the cycle each input occurs by not generating an output until all the inputs have transitioned from a low to a high and back to a low. Y's (for yes) are indicated at positions where the local clock enables data transfer (where all signals are low in this case). N's (for no) are indicated at positions where one or more of the signals are high. Other circuits and transitioning methods may also be employed.

Figure 11:
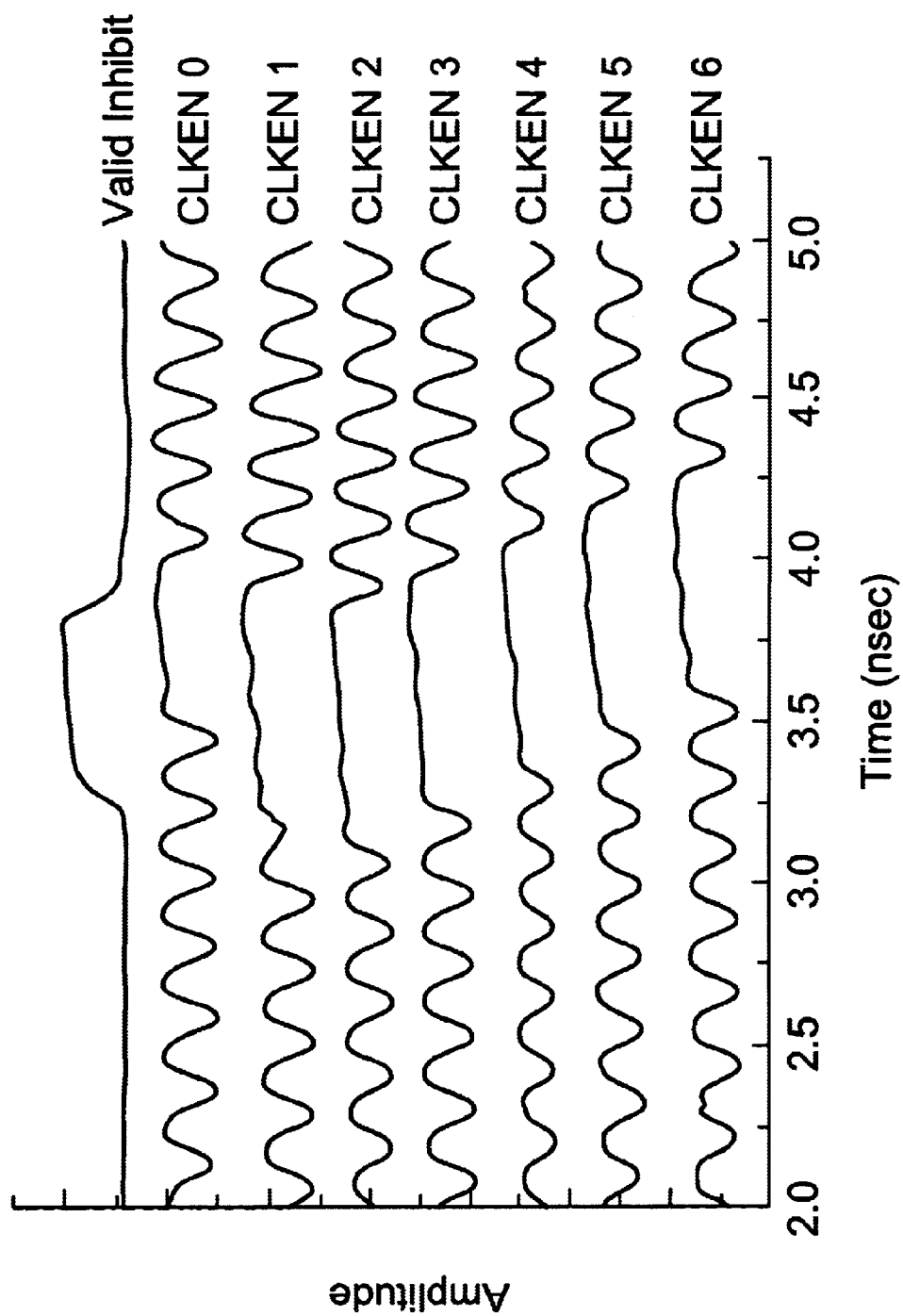
FIG. 11 is a plot of measured waveforms for local clock signals in accordance with the present invention.

Referring to FIG. 11, measured local clock signals (CLKEN 1–6) running at 4.5 GHz are shown in the picoprobe wave forms for a testing operation. The way the interlocking automatically compensates for delay variations, which can result from power supply noise, across chip line width variations, and parameter variations, is also seen in the wave forms when the data valid input of local clock stage 2 (CLKEN 2) is intentionally delayed for a period of time by the externally generated Valid Inhibit signal going high. Because of the handshaking, the local clocks for all the stages before and after stage 2 will also be delayed as shown in the wave forms, until Valid Inhibit goes low again and all the stages resume their normal mode of operation with no loss of data.

A significant power reduction results when there is no operation to perform and the local clocks turn off. This is similar to what happened in the wave forms of FIG. 10 when the data valid signal of clock stage 2 was intentionally inhibited. The wave forms also show that the clock transitions are staggered in time, reducing the peak change in current with respect to time (di/dt) and therefore reducing noise compared to a conventional approach with a single global clock.

Having described preferred embodiments of latch structure for interlocked pipelined CMOS (IPCMOS) circuits (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A circuit having a plurality of stages, each stage comprising:
   a first logic circuit;
   a latch coupled to a second logic circuit of an adjacent stage;
   a switch which connects the first logic circuit to the latch in a first state and disconnects the logic circuit from the latch in a second state; and
   a local clock circuit which controls the first and second states by providing a locally generated clock signal to activate the switch, the locally generated clock signals being generated by interlocking handshake signals from a local clock circuit of an adjacent stage.

2. The circuit as recited in claim 1, wherein the interlocking handshake signals include an acknowledge signal from a downstream local clock circuit and a valid signal from an upstream local clock circuit such that when one stage is enabled immediately adjacent stages are disabled for data transfer in a current clock cycle.

3. The circuit as recited in claim 1, wherein the local clock circuit outputs the locally generated clock responsive to the acknowledge signal and the valid signal.

4. The circuit as recited in claim 1, wherein the interlocking handshake signals guarantee that when a current latch is enabled a latch of a previous stage and a latch of subsequent stage are disabled.

5. The circuit as recited in claim 1, wherein the local clock circuit for each stage is enabled only when there is an operation to perform.

6. The circuit as recited in claim 1, wherein each stage includes a scan chain which permits data to be input and output to each stage in accordance with an external clock.

7. The circuit as recited in claim 1, wherein the latch includes a first end connected to the switch and a second end connected to a data scan latch, the data scan latch connecting the second end of the latch to a first end of a next corresponding latch of an adjacent stage such that data is scanned into or out of the latch through the data scan latch.

8. The circuit as recited in claim 1, wherein the circuit includes an asynchronous pipeline.

9. A method for transferring data in an interlocked pipeline circuit having a plurality of stages, comprising the steps of:
   providing, for each stage, a latch connected to an input of that stage and a switch for selectively coupling the input of the stage to an output of the previous stage;
   when the data is valid in a current stage, sending a valid signal to a local clock circuit of a next stage of the plurality of stages;
   sending an acknowledge signal from the local clock circuit of the next stage to a local clock circuit of the current stage responsive to the valid signal;
   generating a local clock signal at the local clock circuit of the current stage of the plurality of stages based on the acknowledge signal and the valid signal; and
   enabling the switch of the current stage based on the local clock signal to permit data transfer to the latch of the current stage from the output of the previous stage.

10. The method as recited in claim 9, further comprising the step of interlocking the local clock circuits such that when one stage is enabled immediately adjacent stages are disabled for data transfer in a current clock cycle.

11. The method as recited in claim 9, further comprising the step of disabling the switch of the current stage during operations of an adjacent stage.

12. The method as recited in claim 9, wherein the step of generating a local clock signal at the local clock circuit of the current stage includes enabling the local clock circuit for each stage only when there is an operation to perform.

13. The circuit as recited in claim 9, wherein each stage includes a scan chain which permits data to be input and output to each stage in accordance with an external clock.

14. The method as recited in claim 9, wherein the latch of the current stage includes a first end connected to the switch and a second end connected to a data scan latch, the data scan latch connecting the second end of the latch to a first end of a next corresponding latch of an adjacent stage, the method further comprising the step of scanning data into or out of the latch through the data scan latch.

15. The method as recited in claim 14, further comprising the step of selectively enabling the switches to perform data scanning.

* * * * *